US 6,676,746 B2

(12) United States Patent
Langford (10) Patent No.: US 6,676,746 B2
(45) Date of Patent: Jan. 13, 2004

(54) LOW DUST WALL REPAIR COMPOUND (75) Inventor: Nathaniel P. Langford, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 271 days.

(21) Appl. No.: 09/872,000

(22) Filed: Jun. 1, 2001

(65) Prior Publication Data

US 2003/0066456 A1 Apr. 10, 2003

(51) Int. Cl.$^7$ .................... C04B 24/02; C04B 24/08; C04B 24/14
(52) U.S. Cl. ............... 106/778; 106/773; 106/661; 106/665; 106/504; 106/822; 524/4; 524/5
(58) Field of Search .................. 106/778, 817, 106/244, 251, 253, 215.1, 215.2, 159.1, 773, 661, 665, 504, 822; 524/4, 5

(56) References Cited

U.S. PATENT DOCUMENTS

| 4,454,267 A | 6/1984 | Williams |
| 4,549,966 A | 10/1985 | Beall |
| 4,782,632 A | 11/1988 | Matechuk |
| 4,955,748 A | 9/1990 | Krumholz |
| 5,277,712 A | 1/1994 | McInnis |
| 5,534,059 A | * 7/1996 | Immordino, Jr. ............. 106/778 |
| 6,093,241 A | 7/2000 | Alther |
| 6,355,099 B1 | * 3/2002 | Immordino et al. ........ 106/778 |
| 6,358,309 B1 | * 3/2002 | Langford .................... 106/661 |
| 6,436,185 B1 | * 8/2002 | Ayambem et al. .......... 106/793 |
| 2001/0011112 A1 | * 8/2001 | Langford ....................... 524/5 |
| 2001/0023653 A1 | * 9/2001 | Langford .................... 106/504 |

FOREIGN PATENT DOCUMENTS

| DE | 199 54 829 A 1 | 5/2001 |
| EP | 0445653 A1 * | 9/1991 |
| FR | 2554120 A1 * | 3/1985 |
| WO | WO 00/34200 | 6/2000 |

* cited by examiner

Primary Examiner—Anthony J. Green
(74) Attorney, Agent, or Firm—David B. Patchett (57) ABSTRACT The quantity of dust generated by a sandable wall repair compound is reduced by adding a dust reducing additive to the compound. Dust reducing additives include oil, wax, and mixtures thereof. Dust reducing additives containing oil may include rheological and polar additives to minimize the bleeding of the oil into substrates to which the wall repair compound is applied.

15 Claims, 1 Drawing Sheet

Fig. 1

US 6,676,746 B2

LOW DUST WALL REPAIR COMPOUND

FIELD OF THE INVENTION

The present invention relates generally to wall repair compounds which can be sanded to a smooth finish, such as drywall joint compounds, used to repair imperfections in walls or fill joints between adjacent wallboard panels. More particularly, the present invention relates to such a wall repair compound that includes an additive which reduces the quantity of airborne dust generated when the fully dried and hardened compound is sanded, but nevertheless has properties comparable to those of conventional joint compounds.

BACKGROUND OF THE INVENTION

Interior walls of residential and commercial buildings are often constructed using gypsum wallboard panels, often referred to simply as "wallboard" or "drywall." The wallboard panels are attached to studs using nails or other fasteners, and the joints between adjacent wallboard panels are filled using a specially formulated adhesive composition called joint compound to conceal the joints. The procedure for concealing the joint between adjacent wallboards, and thereby producing a smooth seamless wall surface, typically includes applying soft wet joint compound within the joint or seam formed by the abutting edges of adjacent wallboard panels using a trowel or the like. A fiberglass, cloth, or paper reinforcing tape material is then embedded within the wet joint compound, and the compound is allowed to dry and harden. After the joint compound has hardened, a second layer of joint compound is applied over the joint and tape to completely fill the joint and provide a smooth surface. This layer is also allowed to harden. Upon hardening, the joint compound is sanded smooth to eliminate surface irregularities. Paint or a wall covering, such as wall paper, can then be applied over the joint compound so that the joint and the drywall compound are imperceptible under the paint or wall covering. The same joint compound can also be used to conceal defects caused by the nails or screws used to affix the wallboard panels to the studs, or to repair other imperfections in the wallboard panels, so as to impart a continuously smooth appearance to the wall surface.

Various drywall joint compounds are known for concealing joints between adjacent wallboard panels. Conventional joint compounds typically include a filler material and a binder. Conventional fillers are calcium carbonate and calcium sulfate dihydrate (gypsum), which are used in "ready mixed" joint compounds, and calcium sulfate hemihydrate (CaSO$_4$-½ H$_2$O; also referred to as plaster of Paris or calcined gypsum), which is used in "setting type" joint compounds. Ready mixed joint compounds, which are also referred to as pre-mixed or drying type joint compounds, are pre-mixed with water during manufacturing and require little or no addition of water at the job site. Such joint compounds harden when the water evaporates and the compound dries. Setting type joint compounds, on the other hand, harden upon being mixed with water, thereby causing dihydrate crystals to form and interlock. Setting type joint compounds are therefore typically supplied to the job site in the form of a dry powder to which the user then adds a sufficient amount of water to give the compound a suitable consistency.

In an effort to reduce the dust generation and cleanup problems associated with the sanding of conventional joint compounds, various attempts have been made to develop specialized dustless drywall sanders. The Matechuk U.S. Pat. No. 4,782,632, for example, discloses a drywall sander including a sanding head designed to minimize the release of dust and further discloses attaching a vacuum cleaner to the sanding head to collect the dust. The Krumholz U.S. Pat. No. 4,955,748 discloses a dustless drywall finisher which uses a wet sponge to prevent the formation of airborne dust.

Dust remains a problem, however, when conventional power sanders or hand sanders are used to sand conventional joint compounds. A need therefore exists for a joint compound that can be sanded using conventional sanders without producing a large quantity of fine particles capable of becoming suspended in air but whose properties are nevertheless comparable to those of conventional drywall compounds.

It would therefore be desirable to provide a wall repair compound composition that can be sanded without producing a large quantity of airborne dust. It would be desirable to provide an additive that could be mixed with commercially available joint compounds to inhibit the formation of airborne particles during the sanding procedure without otherwise interfering with the properties of the joint compound. More particularly, it would be desirable to provide a low dust wall repair compound composition including a dust reducing additive that does not bleed into porous materials to which it is applied, and further provide such a wall repair compound that adheres well to a variety of surfaces including conventional wallboard, metal, and plastics such as polyvinyl chloride (PVC).

SUMMARY OF THE INVENTION

The present invention provides a wall repair compound, such as a drywall joint compound which, when allowed to fully dry or harden and is then sanded, generates less airborne dust than conventional joint compounds. More specifically, the present invention provides admixing a dust reducing additive to a sandable compound to reduce the quantity of dust generated when the compound is sanded.

The dust reducing additive is typically pre-mixed with the wet joint compound prior to application to the wall surface. Generally, the dust reducing additive reduces the quantity of airborne dust particles having a size of less than or equal to 10 microns to less than 50% of the quantity that would be generated without the additive when the quantity of dust generated is measured using either of the test procedures described below. In certain embodiments, the quantity of airborne dust particles is reduced by at least 75% compared to a mixture without the additive. Most preferably, the level of airborne dust is reduced by more than 90%.

In one embodiment, the average quantity of airborne particles generated by sanding the hardened wall repair compound of the present invention is less than 50 mg/m$^3$ when sanded according to the test procedures described in this specification. In certain other embodiments, the quantity of dust generated is less than about 15 mg/m$^3$, more preferably less than about 10 mg/m$^3$, and most preferably less than about 5 mg/m$^3$.

In one aspect, the present invention provides a sandable wall repair compound composition comprising filler material, binder material, and dust reducing additive means for reducing the quantity of dust generated by the compound when the compound is sanded.

Suitable dust reducing additives include oils, such as mineral oils, vegetable oils and animal oils, surfactants, oleoresinous mixtures, pitch, solvents, paraffins, waxes, including natural and synthetic wax, glycols, and other petroleum derivatives. Other materials which do not fit within the above categories, such as molasses, may also effectively reduce the quantity of dust generated by a wall repair compound.

The wall repair compound formulations include a conventional filler material and a binder material, such as a resin. The wall repair compound may also include a surfactant and a thickening agent. Prior to hardening, the wall repair compound preferably includes a sufficient amount of water to form a mud-like spreadable material which can be applied to the wall surface. The present invention also provides a dust reducing additive which can be admixed with conventional joint compounds to reduce the quantity of dust generated by the conventional compounds during sanding. The dust reducing additive can be used with both drying type (i.e. ready mixed) or setting type joint compounds.

The present invention also provides a joint compound having good tensile strength, sandability, trowelability, plasticity, water retention, cohesiveness, viscosity stability, good hardening properties, good adhesion to metal and PVC, good paint adhesion, resists cracking, has minimal shrinkage, is light weight, low in cost, and has other properties comparable to those offered by conventional joint compounds.

In a specific embodiment of the invention, the dust reducing additive comprises oil. The dust reducing additive may further comprise a mixture of at least two oils, and may further include wax. The mixture of oils may comprise mineral oil and vegetable oil. A preferred mineral oil is Kaydol oil. Suitable vegetable oils include cottonseed oil, linseed oil, coconut oil, olive oil, tung oil, peanut oil, corn oil, and mixtures thereof.

When the dust reducing additive includes oil, the wall repair compound preferably includes a surfactant to help emulsify the oil. The dust reducing additive generally comprises less than about 10% of the wall repair compound total wet weight. Preferably, the dust reducing additive comprises between about 1.0% and about 5% of the wall repair compound by wet weight percent and, most preferably, between about 3% and about 4%. In a specific embodiment of the invention, the dust reducing additive comprises oil and wax, and the ratio of oil to wax in the dust reducing additive is at least about 10:1.

In one embodiment of the invention wherein the dust reducing additive includes wax and oil and the dust reducing additive comprises less than about 0.5% of the compound total wet weight, the dust reducing additive reduces the quantity of dust generated by the compound during sanding at least about 40%. When the quantity of dust reducing additive is increased to about 1.5% of the compound total wet weight, the quantity of dust generated when sanding the compound is reduced at least about 65%. When the quantity of dust reducing additive is increased to about 2.5% of the compound total wet weight, the quantity of dust generated when sanding the compound is reduced at least about 80%. When the quantity of dust reducing additive is increased to about 3.3% of the compound total wet weight, the quantity of dust generated when sanding the compound is reduced at least about 90%. Further reductions in the quantity of dust generated can be achieved by further increasing the quantity of dust reducing additive.

The present invention also provides a sandable low dust drywall joint compound composition comprising filler material, binder material, a dust reducing additive including oil and/or wax, and an effective quantity of a Theological additive to minimize the possibility of the oil from migrating or bleeding into porous substrates to which the joint compound is applied, such as conventional wallboard. The quantity of rheological additive required is the quantity necessary to perform the desired function and depends on the quantity of dust reducing additive present in the formulation. Generally, the quantity of rheological additive is sufficient to eliminate bleeding when the quantity of dust reducing additive is less and 4 wt-% of the wall repair compound total wet weight.

In one embodiment, the rheological additive comprises an organoclay. The rheological additive may comprise bentonite, hectorite, montmorillonite, and mixtures thereof. The joint compound may further include a polar additive. Suitable polar additives include a mixture of methanol and water, propylene carbonate, a mixture of propylene carbonate and water, a mixture of ethanol and water, acetone, g-butyrolactone, or octylphenoxy polyethoxy ethanol. A preferred polar additive is acetone.

The rheological additive generally comprises about 0 to about 1% of the wall repair compound total wet weight, preferably from about 0.05 to about 0.5% and more preferably from about 0.1 to about 0.2%. The Theological additive generally comprises from about 1% to about 10% of the dust reducing additive total wet weight, preferably from about 2% to about 7%, and more preferably from about 3.5% to about 5.5%.

To optimize the effectiveness of the theological additive, a polar additive is also preferably included in the dust reducing additive. The polar additive is generally present in an amount ranging from about 0 to about 0.05% of the wall repair compound total wet weight, preferably from about 0.02 to about 0.04%. The polar additive is generally present in an amount ranging from about 0% to about 4% of the dust reducing additive total wet weight, preferably from about 0.5% to about 2% and more preferably from about 0.6% to about 1%.

The wall repair compound may also include thickeners, wetting agents, preservatives, fungicides and other ingredients found in conventional drywall joint compounds.

In another aspect, the present invention provides a sandable low dust drywall joint compound composition comprising filler material, binder material, and a dust reducing additive comprising a mixture of wax and oil. In a specific aspect of the invention, the dust reducing additive comprises a mixture of wax, oil, a Theological additive, and a polar additive.

The present invention also provides a method of reducing the bleeding of a low dust wall repair compound containing a dust reducing additive with oil by adding a Theological additive to the dust reducing additive. The method may also include adding a polar additive to the dust reducing additive.

These and other features and advantages of the invention will be apparent to those skilled in the art when considered in view of the following detailed description.

DETAILED DESCRIPTION

According to the present invention, there are provided sandable compositions suitable for filling and repairing cracks, seams, holes, or other imperfections in a wall surface, such as the joints between adjacent wallboard panels. The compositions of the present invention include a dust reducing additive combined with conventional wall repair compound materials including filler and binder materials to form a low dust wall repair compound. Dust reducing additive refers to any ingredient capable of preventing, minimizing, suppressing, reducing, or inhibiting the formation of particles capable of becoming airborne. The expressions "airborne particles" or "airborne dust particles" refer to fine particles generated during the sanding or abrading of the compound which are capable of being carried by or through the air. Wall repair compound refers to sandable compositions useful for filling and repairing cracks, seams, holes, and other imperfections in surfaces such as drywall, wood, and plaster. Wall repair compounds include interior finishing and patch compounds such as joint compound and spackling compound.

Any conventional filler material can be used in the present invention. Suitable fillers include calcium carbonate ($CaCO_3$) and calcium sulfate dihydrate ($CaSO_4$-$2H_2O$ commonly referred to as gypsum) for ready mixed type joint compounds, and calcium sulfate hemihydrate ($CaSO_4$-½ $H_2O$) for setting type joint compounds. The wall repair compound may also include one or more secondary fillers such as glass micro bubbles, mica, expanded perlite, talc, limestone, pyrophyllite, silica, and diatomaceous earth. Glass bubbles and expanded perlite generally improve the sandability of the wall repair compound, lower the density and thereby help form a lighter weight wall repair compound, and reduce shrinkage upon drying. Mica helps to prevent cracks from forming as the wall repair compound hardens.

The filler generally comprises from about 20% to about 80% of the weight of the wall repair compound based on the total wet weight of the formulation (i.e. including water). More preferably, the filler comprises from about 40% to about 65% of the total wet weight, and most preferably, from about 45% to about 60%.

The wall repair compound of the present invention also includes a binder or resin. Suitable binders include polyvinyl acetate, polyvinyl alcohol, ethylene vinyl acetate co-polymer, vinylacrylic co-polymer, styrenebutadiene, polyacrylamide, other acrylic polymers, other latex emulsions, natural and synthetic starch, and casein. These binders can be used alone or in combination with one another. The amount of binder can generally range from about 1% to about 25% of the wall repair compound total wet weight. The binder preferably comprises from about 2% to about 15% of the total wet weight, and more preferably, from about 4% to about 9%, and most preferably from 6% to about 8%. Preferred binders are WallPol CPS 104, a plasticized polyvinyl acetate latex available from Reichold Chemical Incorporated, Research Triangle Park, North Carolina, and Rovace 9100, a vinyl acetate/acrylic copolymer available from Rohm and Haas, Philadelphia, Pa.

The wall repair compound may also include a binder thickener to help thicken the binder. Preferred binder thickeners include Acrysol ASE 1000 or Acrysol RM 2020 NPR available from Rohm & Haas, Philadelphia, Pa.

In accordance with a characterizing feature of the invention, the low dust wall repair compound includes a dust reducing additive which serves to reduce the quantity of airborne particles generated during sanding of the dried and fully hardened wall repair compound. The additive generally comprises less than about 10% of the wall repair compound total wet weight. The dust reducing additive preferably comprises about 0.5% to about 5% of the wall repair compound by wet weight percent, more preferably about 2.0% to about 5% and, most preferably, about 3% to about 4%. While the quantity of dust reducing additive needed to reduce the amount of dust generated from sanding the wall repair compound can vary, it was found that compounds including less than 0.5% dust reducing additive reduced dust levels by less than 50%, and quantities greater than 5% tended to bleed in the substrate to which it was applied even if the dust reducing additive included a rheological additive and polar additive intended to eliminate such bleeding.

Many ingredients have been found to effectively reduce the quantity of airborne particles generated when sanding the wall repair compound including oils such as animal, vegetable, and mineral oils (saturated and unsaturated), and oils derived from petroleum, and waxes. A preferred dust reducing additive is a mixture of wax and oil, comprising from about 0.5% to about 5% of the wall repair compound total wet weight, preferably from about 1% to about 5%, more preferably from about 2% to about 4%, and most preferably from about 3% to about 4%. The oil may be mineral oil, vegetable oil, or mixtures thereof. Suitable vegetable oils include cottonseed oil, linseed oil, coconut oil, olive oil, tung oil, peanut oil, corn oil, and mixtures thereof. A preferred mineral oil is Kaydol oil. The ratio of oil to wax in the dust reducing additive generally ranges from about 2:1 to about 20:1, preferably from about 10:1 to about 15:1, and most preferably from 13:1 to 15:1.

To help emulsify the oil, the wall repair compound preferably includes a surfactant comprising generally less than 0.3% of the wall repair compound total wet weight, and preferably from about 0.05% to about 0.2%. A preferred surfactant is Triton X-405, a nonionic surfactant available from Union Carbide Chemicals and Plastics Co. Inc., Danbury, Conn.

To reduce the quantity of water in the formulation, the composition may include a dispersant. Reducing the quantity of water in the composition shortens the drying time of the compound after it has been applied to a surface and minimizes cracking problems associated with shrinkage. The dispersant generally comprises from about 0% to about 2% of the wall repair compound total wet weight, and preferably from about 0.01% to about 0.5%. A suitable dispersant is BYK 156 available from BYK Chemie USA Incorporated, Wallingford, Conn.

The composition may also include an ingredient to slow the drying rate of the wall repair compound and thereby increase the useful open time of the wall repair compound as it is being applied. This evaporation retarding ingredient generally comprises from about 0% to about 2% of the wall repair compound total wet weight, and preferably from about 0.01% to about 0.5%. Suitable ingredients include glycerin, propylene glycol, and ethylene glycol.

The wall repair compound formulation preferably includes a cellulosic thickener, such as a cellulosic ether. Suitable thickeners include methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose (CMC). These thickeners can be used alone or in combination with one another. Other suitable thickeners include Attagel All, an inorganic mineral (clay) thickener available from Engelhard Corporation, Iselin, N.J. and Nexton IP 3, a cellulosic polymer available from Hercules Incorporated, Aqualon Division, Wilmington, Del.

The amount of thickener can range from about 0.5% to about 6% of the wall repair compound total wet weight, preferably from about 1% to about 5%, and more preferably from about 2% to about 4%. In a preferred embodiment, the thickener is a combination of Attagel All and Nexton IP 3 comprising from about 2% to about 4% of the wall repair compound total wet weight, and the ratio of Attagel All to Nexton IP 3 ranges from about 8:1 to about 10:1. The Attagel All also provides the wall repair compound with improved slip properties.

In addition, slip, trowelability, and other application properties of the wall repair compound can be adjusted by adding clays such as attapulgus clay, bentonite, illite, kaolin and sepiolite, and clays mixed with starches.

Dust reducing additives comprising oil preferably include a Theological additive. The Theological additive serves to gel the oil and thereby reduce the migration (i.e. bleeding) of the oil into porous substrates to which the wall repair compound is applied, such as conventional wallboard. Suitable Theological additives include organoclays such as bentonite, hectorite, montmorillonite, and mixtures thereof. A preferred Theological additive is available from Rheox Incorporated, Hightstown, N.J. under the trade name Bentone 38.

The rheological additive generally comprises about 0 to about 1% of the wall repair compound total wet weight, preferably about 0.05 to about 0.5% and more preferably about 0.1 to about 0.2%. The Theological additive generally comprises about 1% to about 110% of the dust reducing additive total wet weight, preferably about 2% to about 7%, and more preferably about 3.5% to about 5.5%.

To optimize the effectiveness of the rheological additive, the dust reducing additive preferably includes a polar additive. The polar additive acts as a wedge to help open up the clay platelets and make them more readily available for developing maximum gelation. Suitable polar additives include mixtures of methanol and water, propylene carbonate, mixtures of propylene carbonate and water, mixtures of ethanol and water, acetone, g-butyrolactone, and octylphenoxy polyethoxy ethanol.

The polar additive is generally present in an amount ranging from about 0.01 to about 0.05% of the wall repair compound total wet weight, preferably from about 0.02 to about 0.04%. The polar additive is generally present in an amount ranging from about 0% to about 4% of the dust reducing additive total wet weight, preferably from about 0.5% to about 2% and more preferably from about 0.5% to about 1%.

To provide a lighter weight (i.e. lower density) compound, glass bubbles or a specially treated expanded perlite can be added as described in U.S. Pat. No. 4,454,267. Additional ingredients which can be utilized in the wall repair compound are preservatives, fungicides, anti-freeze, wetting agents, defoamers, flocculants, such as polyacrylamide resin, and plasticizers, such as dipropylene glycol dibenzoate.

The relative quantity of the various ingredients can vary substantially in accordance with the invention. Table 1 shows the general range of each ingredient for either a setting type joint compound or a ready-mixed type joint compound in its wet condition:

TABLE 1

| | Percent by Weight (Wet) |
|---|---|
| Filler | 20–80% |
| Binder | 1–25% |
| Thickener | <6% |

TABLE 1-continued

| | Percent by Weight (Wet) |
|---|---|
| Water | 2–45% |
| Dust Reducing Additive | <10% |

Test Procedure I

Test Procedure I was used to evaluate the dust generating properties of the wall repair compounds in Examples 1–21. The quantity of airborne particles was measured as follows. First, each test specimen was prepared according to a specific formulation. The specific formulations for the various wall repair compounds are described more fully below along with the method used to prepare the specimens. The test specimens were approximately five inches long, one and one-half inches wide, and one quarter of an inch thick (5" by 1½" by ¼"). Before sanding, each test specimen was allowed to dry and completely harden for at least twenty-four hours at room temperature in an environment where the relative humidity generally ranged from about 25% to about 75%.

Figure 1:
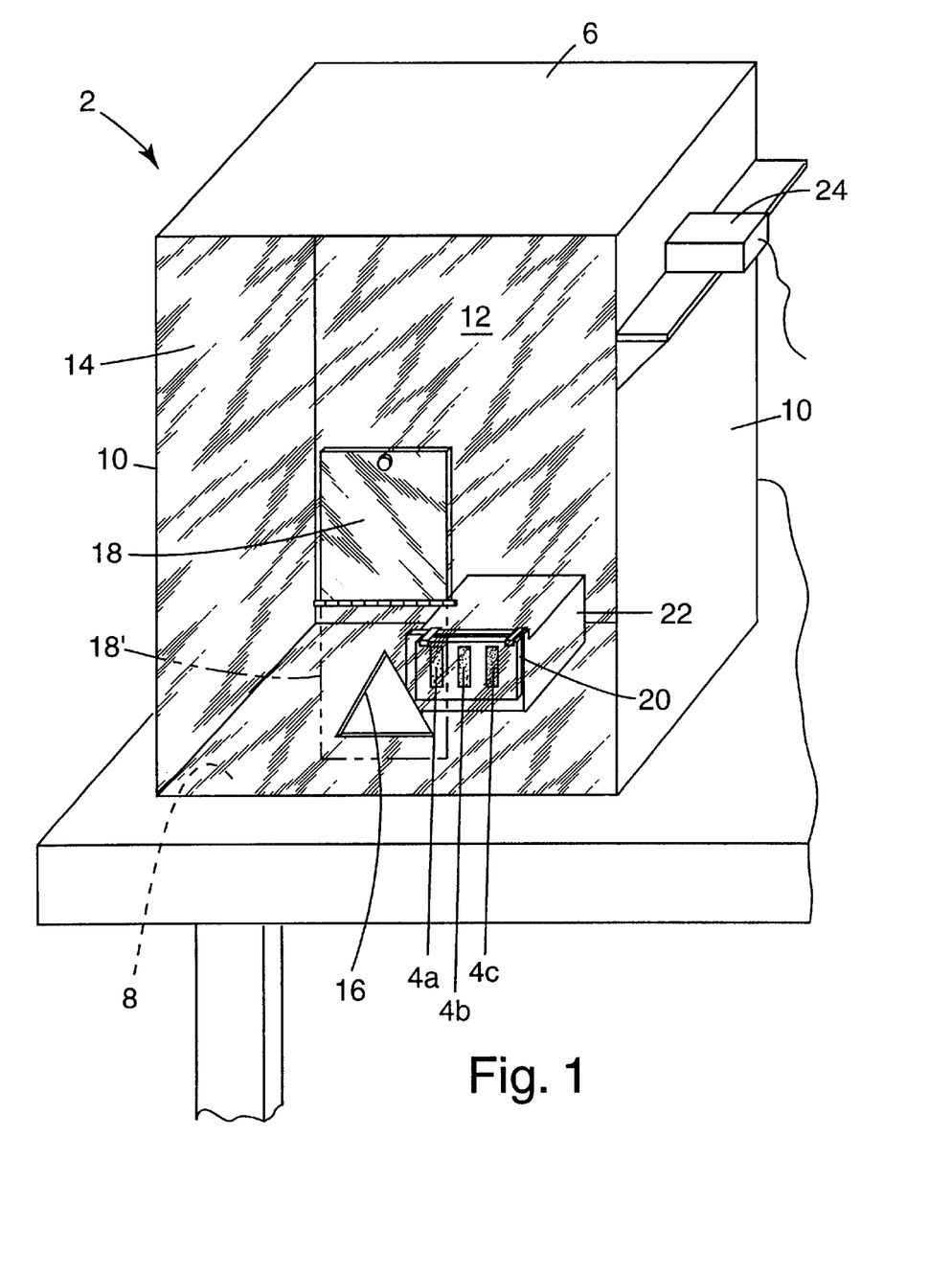
FIG. 1 is a perspective view of the testing enclosure used to measure the quantity of airborne dust generated by sanding the wall repair compounds of the present invention.

Referring to FIG. 1, there is shown the test enclosure 2 that was used to sand the test specimens 4a, 4b, 4c and measure the quantity of airborne dust particles generated. The enclosure 2 was a rectangular box six feet high, four feet wide, and two feet deep (6'×4'×2'). The top 6, bottom 8, side 10, and rear walls 12 of the enclosure 2 were constructed of wood, and the front wall 14 was constructed of transparent Plexiglas. A generally rectangular access opening 16 located about one foot above the bottom wall 8 was provided in the front wall 14 to allow the individual conducting the test to insert his or her hand and arm into the enclosure sand the specimen. The access opening 16 was about 7½ inches wide and about 8½ inches high. A movable cover member 18 was provided to allow the enclosure 2 to be completely sealed when sanding was completed. To sand the specimens 4a, 4b, 4c, the cover 18 was arranged in its up position as shown by the solid lines in FIG. 1. When sanding was completed, the cover 18 was pivoted downwardly to completely cover the access opening 16 as shown in phantom 18'.

As shown, three specimens 4a, 4b, 4c of wall repair compound were prepared on a section of wallboard 20 and the section of wallboard 20 was clamped to a mounting block 22 arranged within the enclosure 2. When tested, the specimens were located about twelve inches above the bottom wall 8 of the enclosure. Each specimen was tested individually and after each test, the enclosure was cleaned so that the quantity of airborne dust particles measured less than 0.05 mg/m³. A particle counter 24 for measuring the quantity of airborne particles was mounted in the right side wall about forty eight inches above the center of the specimens 4a, 4b, and 4c.

The test specimens were sanded using a model BO4552 power palm sander available from Makita Corporation of America, Buford, Ga. To more closely simulate hand handing, the vacuum sanding ports on the bottom of the sander were sealed with a hot melt adhesive. The sander included a 4½×4 inch pad equipped with a 120 grit mesh sanding screen mounted over a 5×3½×¾ inch open, semi-rigid, non-woven, heavy duty, stripping, backing pad available from Minnesota Mining and Manufacturing Company, St. Paul Minn. Sanding was performed at a sanding speed of approximately 14,000 OPM (orbits per minute) using ordinary sanding pressure. Ordinary sanding pressure is defined as the amount of pressure typically required to sand a hardened wall repair compound. Sanding pressure, therefore, is the manual pressure typically applied by an ordinary person when sanding a wall repair compound. It will be recognized that the sanding pressure can vary depending on the hardness of the wall repair compound. Sanding was continued until the specimen was completely sanded. That is, the entire thickness of the specimen was sanded so that a generally smooth wall surface was produced. Care was taken to ensure that sanding was discontinued before the wallboard itself was sanded. The amount of time required to sand each specimen varied depending on the hardness of the wall repair compound and the sanding pressure.

The quantity of airborne dust particles was measured starting from the time sanding was initiated until several minutes after sanding was discontinued. In general, the level of airborne dust was measured until the level decreased to less than 50% of its peak level. The quantity of airborne dust was measured using a DUSTTRAK™ aerosol monitor model 8520 available from TSI Incorporated, St. Paul, Minn. This particle counter measures the number of particles having a size of less than or equal to 10 microns. The quantity of dust measured in Examples 1–21 is the maximum level observed during the test.

Test Procedure II

Test Procedure II was used to measure the quantity of airborne dust particles produced in Examples 22–38. Test Procedure II was the same as Test Procedure I except the specimens were allowed to dry for at least 72 hours before sanding and the level of airborne dust particles was measured as the average level of airborne dust during the first four minutes of the test measured from the time sanding was initiated.

Ingredients

A summary of the various ingredients used to prepare the wall repair compounds in each of the Examples is provided below:

Fillers

Calcium Carbonate—Marble Dust available from ECC International, Sylacauga, Ala.

Calcium Carbonate—Microwhite 100 available from ECC International, Sylacauga, Ala.

Calcium Sulfate Dihydrate—available from J. T. Baker Chemical Co., Phillipsburg, N.J.

Mica—Mica AMC available from Kraft Chemical Co., Melrose Park, Ill.

Kaolin—Aldrich Chemical Co., Milwaukee, Wis.

Glass Bubbles—K1 (177 microns–0.14 g/cm$^3$) glass bubbles available from Minnesota Mining and Manufacturing Company, St. Paul, Minn.

Expanded Perlite—SilCel 43/34 sodium potassium aluminum silicate available from Silbrico Corporation, Hodgkins, Ill.

Binders

Airflex RP-226—vinyl acetate-ethylene copolymer available from Air Products and Chemicals, Inc., Allentown, Pa.

Rhoplex HG 74M, Rhoplex HG 74P, Rhoplex AC 417M, Rhoplex 2620, and Rhoplex EC-2848—acrylic resins available from Rohm & Haas, Philadelphia, Pa.

Rovace 9100—a vinyl acetate/acrylic copolymer available from Rohm and Haas, Philadelphia, Pa.

WallPol CPS 104—a plasticized polyvinyl acetate latex available from Reichold Chemical Incorporated, Research Triangle Park, N.C.

Waxes

Octowax 321—available from Tiarco Chemical Div., Textile Robber & Chemical Co., Dalton, Ga.

Boler wax 1070, Boler wax IGI 941—a paraffin waxes available from Boler Inc., Wayne Pa.

Carbowax 540—synthetic wax available from Union Carbide Corp., Danbury, Conn.

Oils

Corn Oil—conventional corn oil. A suitable corn oil is available from Eastman Kodak Co., Rochester, N.Y.

Linoleic Acid—an unsaturated oil, available from Eastman Kodak Co., Rochester, N.Y.

Castor Oil—an unsaturated vegetable oil available from Aldrich Chemical Co., Milwaukee, Wis.

Tung Oil—an unsaturated vegetable oil available from Woodworkers Store, Medina, Minn.

Mineral Oil—Carnation light mineral oil available from Witco Corporation, Sonneborn Division, New York, N.Y.

Kaydol—a mineral oil available from Witco Corporation, New York, N.Y.

Surfactants

Small amounts of surfactants were generally included in the wall repair compound formulations when the dust reducing additive included an oil to help emulsify the oil and combine it with a water based wall repair compound. Certain surfactants, however, were found to have a dust reducing effect at higher concentrations when used by themselves.

FC 430—a nonionic surfactant available from Minnesota Mining and Manufacturing Company, Industrial Chemicals, St. Paul, Minn.

Triton X-405—a nonionic surfactant (octylphenoxy polyethoxy ethanol) available from Union Carbide Chemicals and Plastics Co. Inc., Danbury, Conn.

Variquat B-200—a cationic surfactant (benzyl trimethyl ammonium chloride 60%) available from Sherex Chemical Co. Inc., Dublin, Ohio.

Steol KS 460—an anionic surfactant (alkyl ether sulfate sodium salt 60%) available from Stephon Chemical Co., Northfield, Ill.

Span 85—a nonionic surfactant (sorbitan trioleate) available from ICI Americas Inc., Wilmington, Del.

Tween 80—nonionic surfactant (polysorbate 80) available from ICI Americas Inc., Wilmington, Del.

Thickeners

Methocel 311—hydroxypropyl methylcellulose available from Dow Chemical Co., Midland, Mich.

Attagel All—hydrated aluminum magnesium silicate available from Engelhard Corporation, Iselin, N.J.

Nexton IP3—cellulosic polymer available from Hercules Incorporated, Aqualon Division, Wilmington, Del.

Preservatives

Troysan Polyphase P-20T—available from Troy Chemical Corporation, Newark, N.J.

Troysan 174—2(Hydroxy methyl) Amino(ethanol) available from Troy Chemical Corporation, Newark, N.J.

Miscellaneous

Acetone—available from EM Science, Gibbstown, N.J.

Bentone 38—organoclay (tetraalkyl ammoniumhectorite) available from Rheox Incorporated, Hightstown, N.J.

Acrysol ASE 1000—an acrylic emulsion polymer available from Rohm & Haas, Philadelphia, Pa.

Acrysol RM 2020NPR—a hydrophobically modified ethylene-oxide based urethane block copolymer available from Rohm & Haas, Philadelphia, Pa.

Glycerin—available from J. T. Baker Chemical Company, Phillipsburg, N.J.

BYK 156—a dispersant (ammonium salt of acrylic copolymer) available from BYK Chemie USA Incorporated, Wallingford, Conn.

EXAMPLES

The invention is illustrated by the following examples which present various embodiments of the invention. In general, the wall repair compounds were prepared by: (1) mixing the water and thickener, if any, with the binder; (2) adding the dust reducing additive; and (3) adding the fillers, mixing continuously. If the formulation contained a dust reducing additive including an oil and/or wax, then a surfactant was typically added to the wall repair compound formulation before the dust reducing additive was added. More specific procedures used to prepare certain wall repair compound formulations are described more fully below.

Table 2 presents the test results for a control wall repair compound formulation which did not contain a dust reducing additive, along with the formulation and test results for Examples 1–3, each of which contained a dust reducing additive in the form of a wax. Each formulation is presented by wet weight percent of each ingredient, that is, including water.

TABLE 2

WAXES

Formulations by Wet Weight Percent

| Ingredient | Control | 1 | 2 | 3 |
|---|---|---|---|---|
| Calcium carbonate | 64.3 | 61.24 | 44.0 | 63.34 |
| Mica | | 2.7 | | |
| Kaolin | 1.0 | 2.1 | | 1.04 |
| Glass Bubbles | 4.7 | | 6.0 | 1.73 |
| Rhoplex AC 417 M | 10.1 | 9.8 | 17.0 | |
| Airflex RP-226 | | | | 5.23 |
| Triton X-405 | | 0.13 | 0.2 | 0.16 |
| Stearic Acid | | | 0.75 | |
| 28% Ammonium Hydroxide | | | 0.38 | |
| Water | 19.9 | 16.9 | 24.17 | 24.87 |
| Octowax 321 | | 7.13 | | |
| Boler 1070 | | | 7.5 | |
| Carbowax 540 | | | | 3.63 |
| Airborne Dust | 72 mg/m³ | 28 mg/m³ | 3.5 mg/m³ | 5 mg/m³ |
| Drying Time | 1 day | 1 day | 1 day | 1 day |

The control formulation included a binder (Rhoplex AC 417 M), fillers (calcium carbonate, kaolin, and glass bubbles), and water. After being allowed to dry for one day, the specimen having the control formulation was sanded and found to produce a peak quantity of airborne dust particles having a size of less than or equal to 10 microns of 72 mg/M³. In Example 1, the formulation includes approximately 7% by weight wax (Octowax 321) which reduced the quantity of airborne dust to 28 mg/M³. In Example 2, the secondary fillers mica and kaolin have been replaced by glass bubbles, and a paraffin wax (Boler 321) was added. The quantity of dust generated by the resulting formulation was reduced to 3.5 mg/m³. The formulation of Example 2 was prepared by combining the wax and stearic acid and heating them to 170° F. until a clear liquid was formed. Approximately half of the water was then heated to 170° F. and added to the ammonium hydroxide. The wax-stearic acid mixture was then combined with the water-ammonium hydroxide mixture, and this mixture was cooled to room temperature while mixing continuously. In turn, the Rhoplex AC 417M, the Triton X-405, the remaining quantity of water, the calcium carbonate, and the glass bubbles were added and mixed to produce a uniform mixture.

The wall repair compound formulation in Example 3 contains a vinyl acetate binder (Airflex RP-226) and a wax (Carbowax 540—polyethylene glycol). This wall repair compound formulation exhibited a dust level of 5 mg/m³. Carbowax is a synthetic wax which is soluble or miscible in water. While paraffins and Carbowax are both considered waxes, they are believed to represent dissimilar waxes.

Table 3A presents the formulations and test results for Examples 4–9, each of which contains one oil and a surfactant which serve to suppress the formation of airborne dust particles during sanding.

TABLE 3A

OILS

Formulations by Wet Weight Percent

| Ingredient | 4 | 5 | 6 | 7 | 8 | 9 |
|---|---|---|---|---|---|---|
| Calcium Carbonate | 54.94 | 54.72 | 54.72 | 55.15 | 56.41 | 56.6 |
| Glass Bubbles | 8.9 | 10.8 | 10.8 | 8.55 | 8.25 | 6.32 |
| Rhoplex AC 417M | 15.63 | 15.57 | 15.57 | 15.69 | 25.77 | 26.31 |
| Triton X-405 | 0.39 | 0.39 | 0.39 | 0.39 | 0.21 | 0.21 |
| Water | 15.5 | 15.44 | 15.44 | 15.56 | 6.19 | 6.32 |
| Corn oil | 4.64 | | | | | |
| Linoleic acid | | 3.08 | 3.08 | | | |
| Castor oil | | | | 4.66 | | |
| Mineral oil | | | | | 3.17 | |
| Tung oil | | | | | | 4.24 |
| Airborne Dust | 2.3 mg/m³ | 3.5 mg/m³ | 45 mg/m³ | 2.5 mg/m³ | 7 mg/m³ | 13 mg/m³ |
| Drying Time | 1 day | 1 day | 30 days | 2 days | 1 day | 2 days |

In each example, the oil significantly reduced the quantity of airborne particles produced during sanding. It will be noted that Examples 5 and 6 had similar formulations. In Example 5, however, the specimen was permitted to dry for only 1 day and in Example 6, the specimen was permitted to dry for 30 days. By increasing the drying time from 1 day to 30 days, the quantity of airborne dust generated having a size less than or equal to 10 microns increased from 3.5 to 45 mg/m³. It has generally been observed that unsaturated oils, such as unsaturated vegetable oils and linoleic acid, reduce the quantity of airborne particles generated after a short drying time (e.g. 1 day) without significantly affecting the adhesive properties of the wall repair compound. In addition, the wall repair compound can be sanded quite easily. After an extended drying time (e.g. 30 days), however, it has been observed that the wall repair compound becomes more difficult to sand and the quantity of airborne dust particles increases. As shown in Example 8, mineral oil by itself was also found to significantly reduce airborne dust levels after a short drying time. In addition, mineral oil has been found to reduce airborne dust levels over an extended period of time. Mineral oil, however, was found to adversely affect the adhesive properties of the wall repair compound.

Table 3B presents the formulations and test results for Examples 10–15, each of which includes a dust reducing additive comprising a mixture of corn oil and mineral oil, and a surfactant. In each Example, the mineral oil and corn oil were premixed.

TABLE 3B

OIL MIXTURES

Formulations by Wet Weight Percent

| Ingredient | 10 | 11 | 12 | 13 | 14 | 15 |
|---|---|---|---|---|---|---|
| Calcium Carbonate | 68.65 | 63.69 | 63.69 | 58.07 | 61.05 | 61.05 |
| Glass Bubbles | | 4.8 | 4.8 | 5.0 | 5.25 | 5.25 |
| Mica | 3.0 | | | | | |
| Kaolin | 2.4 | 0.99 | 0.99 | | 3.0 | 3.0 |
| Rhoplex AC 417M | 11.0 | 9.9 | 9.9 | | | |
| Rhoplex HG 74M | | | | 15.13 | 11.0 | 11.0 |
| Triton X-405 | 0.15 | 0.15 | 0.15 | | | |
| Variquat B-200 | | | | | 0.20 | |
| Steol KS-460 | | | | | | 0.20 |
| FC 430 | | | | 0.15 | | |
| Methocel 311 | | | | 0.14 | | |
| Water | 11.3 | 15.5 | 15.5 | 18.01 | 17.0 | 17.0 |
| Corn oil | 0.5 | 0.99 | 0.99 | 0.5 | 0.5 | 0.5 |
| Mineral oil | 3.0 | 3.98 | 3.98 | 3.0 | 2.0 | 2.0 |
| Airborne Dust | 5 mg/m$^3$ | 1.5 mg/m$^3$ | 5.5 mg/m$^3$ | 2.5 mg/m$^3$ | 10 mg/m$^3$ | 7 mg/m$^3$ |
| Drying Time | 1 day | 1 day | 19 days | 4 days | 4 days | 4 days |

The combination of mineral oil and an unsaturated oil, such as linoleic acid or corn oil which contains some linoleic acid, was found to be a low dust additive that did not significantly adversely affect the adhesive properties of the wall repair compound and also reduced airborne dust levels over an extended period of time.

Examples 11 and 12 have similar formulations but in Example 12, the drying time was increased to 19 days. As shown, the quantity of dust generated after 19 days increased only slightly. Thus, the dust reducing capability of the corn oil—mineral oil mixture remained much more stable over time than the formulations including linoleic acid presented in Examples 5 and 6.

Example 13 shows that significant dust reduction is also achieved when using a combination additive of corn oil and mineral oil in a wall repair compound that contains a thickener (i.e. Methocel 311). Example 13 was prepared by premixing the Methocel 311 with the water until a clear liquid was formed. The surfactant FC 430 and resin Rhoplex HG 74M were then added. Next, the mineral oil and corn oil were premixed and added to the other ingredients, mixing continuously. The calcium carbonate and glass bubbles were then added.

The formulations of the wall repair compounds in Examples 14 and 15 were similar but Example 14 included a cationic surfactant (Variquat B-200) and Example 15 included an anionic surfactant (Steol KS-460). In both examples, the mixture of corn oil and mineral oil together with the surfactant significantly reduced the quantity of airborne dust generated.

It was found, however, that dust reducing additives including oil had a tendency to bleed into porous substrates, such as conventional wallboard, when applied to such substrates.

Table 4 presents the test results for Examples 29–33 which show the level of airborne dust generated by formulations containing different surfactants.

TABLE 4

SURFACTANTS

Formulations by Wet Weight Percent

| Ingredient | 16 | 17 | 18 | 19 | 20 |
|---|---|---|---|---|---|
| Calcium Carbonate | 63.91 | 61.05 | 61.05 | 62.98 | 62.57 |
| Kaolin | | 3.0 | 3.0 | 1.03 | 1.03 |
| Glass Bubbles | 5.01 | 5.25 | 5.25 | 4.02 | 4.61 |
| Rhoplex HG 74M | 11.03 | 11.0 | 11.0 | 11.35 | 11.28 |
| Water | 17.04 | 17.0 | 17.0 | 17.53 | 17.43 |
| Triton X-405 | 3.01 | | | | |
| Variquat B-200 | | 2.7 | | | |
| Steol KS-460 | | | 2.7 | | |
| Span 85 | | | | 3.09 | |
| Tween 80 | | | | | 3.08 |
| Airborne Dust | 65 mg/m$^3$ | 63 mg/m$^3$ | 42 mg/m$^3$ | 10 mg/m$^3$ | 8.5 mg/m$^3$ |
| Drying Time | 1 day | 4 days | 4 days | 5 days | 5 days |

It will be noted that in Examples 16–20, the percentage of surfactant added to the wall repair compound formulations was significantly greater than the quantity used to emulsify the oil in Examples 4–15 which ranged from 0.15 to 0.39 percent by weight. In Example 16, the nonionic surfactant Triton X-405 was found to only slightly reduce the quantity of airborne dust compared to the control formulation. Similarly, in Example 17, the cationic surfactant Variquat B-200 was found to slightly reduce the quantity of airborne dust. In Example 18, the anionic surfactant Steol KS-460 was found to moderately reduce the quantity of airborne dust. It was noted that each of the surfactants in Examples 16–18 was initially solid materials which had to be solubilized in water.

In Examples 19 and 20, the surfactants were liquids which did not dry easily. In Example 19, the nonionic surfactant Span 85, which is insoluble in water and has an HLB of 1.8, was found to have a significant dust reducing effect. In Example 20, Tween 80, which is soluble in water and has an HLB of 15, was found to have a significant dust reducing effect. It was therefore observed from Examples 19 and 20 that liquid surfactants which do not dry quickly may themselves serve as effective dust reducing additives. It was found that the most effective surfactants were those that evaporated slower than water. It was also found, however, that some surfactants adversely affect the internal strength of the joint compound.

Table 5 presents the formulations and test results for wall repair compound formulations containing a calcium sulfate dihydrate filler material. In Example 21, a significant reduction in airborne dust generation was achieved by including a dust reducing additive comprising a mixture of surfactant, corn oil, and mineral oil in the wall repair compound.

TABLE 5

CALCIUM SULFATE DIHYDRATE FILLER

| | Formulations by Wet Weight Percent | |
|---|---|---|
| Ingredient | Control | 21 |
| Calcium Sulfate Dihydrate | 70.36 | 66.6 |
| Rhoplex HG 74M | 8.64 | 9.7 |
| Water | 21 | 19.3 |

TABLE 5-continued

CALCIUM SULFATE DIHYDRATE FILLER

| Ingredient | Formulations by Wet Weight Percent | |
| --- | --- | --- |
| | Control | 21 |
| Triton X-405 | | 0.2 |
| Corn oil | | 0.7 |
| Mineral oil | | 3.5 |
| Airborne Dust | 225 mg/m³ | 20 mg/m³ |
| Drying Time | 1 day | 1 day |

Table 6 presents test results obtained using several commercially available joint 10 compounds.

TABLE 6

CONVENTIONAL JOINT COMPOUNDS - NO ADDITIVE

| Conventional Joint Compound | Airborne Dust | Drying Time |
| --- | --- | --- |
| All Purpose Joint Compound | 100 mg/m³ | 3 days |
| Light weight All Purpose Joint Compound | 155 mg/m³ | 3 days |
| Gold Bond Pro Form Prof. Lite Joint Compound | 90 mg/m³ | 4 days |
| Easy Sand 90 Setting Joint Compound | 280 mg/m³ | 3 days |

The first three joint compounds are ready-mixed type joint compounds manufactured and marketed by United States Gypsum Co., Chicago, Ill., and Easy Sand 90 is a setting type joint compound manufactured by National Gypsum Co., Charlotte, N.C.

Table 7 shows the effect of adding a dust reducing additive to the conventional joint compounds of Table 6.

TABLE 7

CONVENTIONAL JOINT COMPOUND WITH ADDITIVE

| | Formulations by Wet Weight Percent | | | |
| --- | --- | --- | --- | --- |
| Ingredient | All Purpose Joint Compound | Light weight All Purpose Joint Compound | Gold Bond Pro Formula Professional Lite Joint Compound | Easy Sand 90 Setting Joint Compound |
| Joint Compound | 96.35 | 96.35 | 96.35 | 67.74 |
| Corn oil | 0.5 | 0.5 | 0.5 | 0.51 |
| Mineral oil | 3.0 | 3.0 | 3.0 | 4.1 |
| Triton X-405 | 0.15 | 0.15 | 0.15 | 0.15 |
| Water | | | | 27.5 |
| Airborne Dust | 2 mg/m³ | 12 mg/m³ | 5 mg/m³ | 13 mg/m³ |
| Drying Time | 3 days | 1 day | 1 day | 2 days |

In each case, a premixed dust reducing additive including corn oil, mineral oil, and the surfactant Triton X-405 was added to each of the conventional joint compounds just prior to preparing the specimens, thereby serving to significantly reduce the quantity of airborne dust generated by sanding the hardened joint compound.

Table 8 presents the formulations and test results for wall repair compound formulations including Theological and polar additives added to prevent or at least significantly reduce the likelihood of bleeding from dust reducing additives containing oil.

TABLE 8

RHEOLOGICAL & POLAR ADDITIVES

| | Formulations by Wet Weight Percent | | | | | |
| --- | --- | --- | --- | --- | --- | --- |
| Ingredient | 22 | 23 | 24 | 25 | 26 | 27 |
| Microwhite 100 | 45.72 | 45.72 | 45.42 | 45.42 | 45.42 | 45.42 |
| SilCel 43/34 | 6.0 | 6.0 | 6.0 | 6.0 | 6.0 | 6.0 |
| Glass Bubbles | 0.5 | 0.5 | 0.5 | 0.5 | 0.5 | 0.5 |
| Attagel All | 2.93 | 2.93 | 2.93 | 2.93 | 2.93 | 2.93 |
| Nexton IP3 | 0.297 | 0.297 | 0.297 | 0.297 | 0.297 | 0.297 |
| WallPol CPS 104 | 2.5 | 2.5 | 2.5 | 2.5 | 2.5 | 2.5 |
| Rovace 9100 | 4.5 | 4.5 | 4.5 | 4.5 | 4.5 | 4.5 |
| Polyphase P-20-T | 0.037 | 0.037 | 0.037 | 0.037 | 0.037 | 0.037 |
| Troysan 174 | 0.05 | 0.05 | 0.05 | 0.05 | 0.05 | 0.05 |
| Triton X-405 | 0.1 | 0.1 | 0.1 | 0.1 | 0.1 | 0.1 |
| Glycerin | 0.3 | 0.3 | 0.3 | 0.3 | 0.3 | 0.3 |
| BYK 156 | 0.3 | 0.3 | 0.3 | 0.3 | 0.3 | 0.3 |
| Water | 33.47 | 33.47 | 33.47 | 33.47 | 33.47 | 33.47 |
| Acrysol ASE 1000 | | | 0.3 | | 0.3 | |
| Acrysol RM 2020 | | | | 0.3 | | 0.3 |
| Bolar wax IGI 941 | 0.21 | NONE | 0.21 | 0.21 | NONE | NONE |
| Corn oil | 0.792 | 0.787 | 0.792 | 0.792 | 0.787 | 0.787 |
| Kaydol oil | 2.08 | 2.364 | 2.08 | 2.08 | 2.364 | 2.364 |
| Bentone 38 | 0.165 | 0.122 | 0.165 | 0.165 | 0.122 | 0.122 |
| Acetone | 0.0297 | 0.0264 | 0.0297 | 0.0297 | 0.0264 | 0.0264 |
| Airborne Dust | 2.3 mg/m³ | 1.7 mg/m³ | 3.7 mg/m³ | 2.5 mg/m³ | 2.6 mg/m³ | 2.0 mg/m³ |
| Drying Time | 13 days | 13 days | 13 days | 13 days | 13 days | 13 days |

The compounds were prepared by adding and mixing the ingredients in the following order: Attagel All, Nexton IP3, WallPol CPS 104, Rovace 9100, Acrysol ASE1000 and Acrysol RM 2020 NPR premixed (if present), Polyphase P-20-T, Troysan 174, Triton X-405, dust reducing additive, glycerin, BYK 156, Microwhite 100, SilCel 43/34, and Glass Bubbles K1. The Attagel All was premixed with water to form an aqueous solution of 12.5% Attagel All and 87.5% water, and the Nexton IP3 was premixed with water to form an aqueous solution of 2.25% Nexton IP3 and 97.75% water, thus no water by itself was added to the formulation.

The dust reducing additive was prepared as shown in Table 9 and described below:

TABLE 9

DUST REDUCING ADDITIVE

| Ingredient | Wet Weight Percent |
| --- | --- |
| 1. Kaydol oil | 35 |
| 2. Corn oil | 10 |
| 3. Bentone 38 | 5 |
| 4. Acetone | 0.9 |
| 5. 20% Bolar wax & 80% Kaydol oil | 35.1 |
| 6. Corn oil | 14 |

First the 35% Kaydol oil and 10% corn oil were mixed. The 5% Bentone 38 was then added and mixed for fifteen minutes with high shear using a cowels blade. The 0.9% acetone was then added and high shear mixing was continued for an additional twenty minutes. Next, the pre-mixture of 20% Bolar wax and 80% Kaydol oil comprising 35.1% of the dust reducing additive was added. To facilitate the addition of this pre-mixture, the wax and oil were heated to form a homogeneous liquid. Last, the 14% corn oil was added and high shear mixing was continued for twenty additional minutes. The procedure to prepare the formulations not containing wax was the same as the procedure for preparing those with wax except in step 5 the additive was all Kaydol oil. That is, after the acetone was added, 35.1% Kaydol oil was added.

In each example in Table 8, the dust reducing additive was the same except in Examples 22, 24, and 25, the dust reducing additive included wax (Bolar wax IGI 941) in addition to the corn oil, Kaydol oil, Bentone 38, and acetone. In each case, Bentone 38 was the rheological additive added to the dust reducing additive to reduce the likelihood of the additive bleeding into the wallboard, and acetone was the polar additive added to maximize the effectiveness of the Bentone 38 by acting as a wedge to help open up the clay platelets in the Bentone 38 and making them more readily available for developing maximum gelation.

After the wall repair compounds of Examples 22–27 were prepared, they were allowed to age for three days. After three days, the compounds were applied to conventional wallboard and allowed to dry and harden for thirteen days. After thirteen days, no bleeding was observed on the wallboard for any of the formulations in Examples 22–27. Thus, it was found that adding a Theological additive and a polar agent to the wall repair compound formulations of Examples 22–27, each of which included a dust reducing additive with oil, effectively eliminated bleeding of the oil into the wallboard to which it was applied.

Examples 22 and 23 are the same except Example 23 includes a wax in the dust reducing additive. As can be seen, in both examples the level of dust generated was low. Thus, the presence of wax in the formulation of Example 23 did not appear to have a significant impact on the level of dust generated.

Examples 24 and 25 both include wax in the dust reducing additive and are the same except that Example 24 includes Acrysol ASE 1000 and Example 25 includes Acrysol RM 2020. By comparing Example 22 with Examples, 24 and 25, it was found that the addition of Acrysol had little affect on the level of dust generated. Formulations including Acrysol ASE 1000, however, did appear to exhibit improved adhesion to metal.

Examples 26 and 27 are the same as Examples 24 and 25, respectively, expect the dust reducing additive in Examples 26 and 27 did not contain wax. By comparing Examples 26 and 27 with Examples 24 and 25, it was found that the omission of wax did not significantly affect the level of dust generated. In addition, by comparing Examples 26 and 27 with Example 23, it was found that the addition of the Acrysols did not significantly affect the level of dust generated.

Wall repair compounds including a dust reducing additive with wax (Examples 22, 24, and 25) seemed to exhibit greater adhesion to PVC than dust reducing additives comprising oil, Bentone and Acetone without wax (Examples 23, 26, and 27). Adhesion to metal, on the other hand, appeared largely unaffected by the presence or absence of wax in the formulation.

Table 10 presents the formulations and test results for wall repair compound formulations including different quantities of a dust reducing additive.

TABLE 10

DIFFERENT LEVELS OF DUST REDUCING ADDITIVE

| | Formulations by Wet Weight Percent | | | | | | |
| --- | --- | --- | --- | --- | --- | --- | --- |
| Ingredient | Control | 28 | 29 | 30 | 31 | 32 | 33 |
| Microwhite 100 | 45.72 | 45.72 | 45.72 | 45.72 | 45.72 | 45.02 | 45.02 |
| SilCel 43/34 | 5.9 | 5.9 | 5.9 | 5.9 | 5.9 | 5.9 | 5.9 |
| Glass Bubbles | 0.5 | 0.5 | 0.5 | 0.5 | 0.5 | 0.5 | 0.5 |
| Attagel All | 2.93 | 2.93 | 2.93 | 2.93 | 2.93 | 2.93 | 2.93 |
| Nexton IP3 | 0.297 | 0.297 | 0.297 | 0.297 | 0.297 | 0.297 | 0.297 |
| WallPol CPS 104 | 2.6 | 2.6 | 2.6 | 2.6 | 2.6 | 2.6 | 2.6 |
| Rovace 9100 | 4.59 | 4.59 | 4.59 | 4.59 | 4.59 | 4.59 | 4.59 |
| Polyphase P-20-T | 0.037 | 0.037 | 0.037 | 0.037 | 0.037 | 0.037 | 0.037 |
| Troysan 174 | 0.05 | 0.05 | 0.05 | 0.05 | 0.05 | 0.05 | 0.05 |
| Triton X-405 | 0.1 | 0.1 | 0.1 | 0.1 | 0.1 | 0.1 | 0.1 |
| Glycerin | 0.3 | 0.3 | 0.3 | 0.3 | 0.3 | 0.3 | 0.3 |
| BYK 156 | 0.3 | 0.3 | 0.3 | 0.3 | 0.3 | 0.3 | 0.3 |
| Water | 33.393 | 33.393 | 33.393 | 33.393 | 33.393 | 33.393 | 33.393 |
| Bolar wax IGI 941 | 0 | 0.035 | 0.105 | 0.176 | 0.231 | 0.28 | 0.35 |
| Corn Oil | 0 | 0.12 | 0.36 | 0.6 | 0.792 | 0.96 | 1.2 |
| Kaydol Oil | 0 | 0.315 | 0.946 | 1.577 | 2.08 | 2.523 | 3.155 |
| Bentone 38 | 0 | 0.025 | 0.075 | 0.125 | 0.165 | 0.2 | 0.25 |
| Acetone | 0 | 0.0046 | 0.014 | 0.023 | 0.03 | 0.036 | 0.045 |
| Total wt DRA | 0 | 0.5 | 1.5 | 2.5 | 3.3 | 4.0 | 5.0 |
| Actual % DRA | 0 | 0.514 | 1.527 | 2.52 | 3.3 | 4.0 | 4.95 |

TABLE 10-continued

DIFFERENT LEVELS OF DUST REDUCING ADDITIVE

| | Formulations by Wet Weight Percent | | | | | | |
|---|---|---|---|---|---|---|---|
| Ingredient | Control | 28 | 29 | 30 | 31 | 32 | 33 |
| Airborne Dust | 90.8 mg/m$^3$ | 46.1 mg/m$^3$ | 29.6 mg/m$^3$ | 17.7 mg/m$^3$ | 6.3 mg/m$^3$ | 3.5 mg/m$^3$ | 2.4 mg/m$^3$ |
| Drying Time | 3 days | 3 days | 3 days | 3 days | 3 days | 3 days | 3 days |

In Examples 28–33, the dust reducing additive comprised a mixture of wax, corn oil, Kaydol oil, Bentone 38, and acetone. The control formulation in Table 10 contained no dust reducing additive and generated an average quantity of dust during the first four minutes of sanding of 90.8 mg/m$^3$, which is a typical quantity of dust for conventional drywall joint compounds not containing a dust reducing additive.

By comparing the control formulation with Example 28, it was found that by adding a dust reducing additive in an amount equal to approximately 0.5% of the compound total wet weight reduced the quantity of dust generated by almost 50% to 46.1 mg/m$^3$. The addition of larger quantities of the dust reducing additive resulted in further reductions in the quantity of dust generated as seen from Examples 29–33. When a quantity of dust reducing additive in an amount equal to approximately 3.3% of the compound total wet weight was added (Example 31), the level of dust was reduced 6.3 mg/m$^3$, a reduction of greater than 90%. When a quantity of dust reducing additive in an amount equal to approximately 5% of the compound total wet weight was added (Example 33), the level of dust was reduced 2.4 mg/m$^3$, a reduction of greater than 95%.

In Examples 28–32, no bleeding was observed. In Example 33, however, with the elevated level of dust reducing additive, some minor bleeding was observed. Thus, while it was found that at low to moderate levels of dust reducing additive, the Bentone 38 and acetone completely eliminated bleeding, at high levels of dust reducing additive, some bleeding may occur.

Table 11 presents the formulations and test results for wall repair compound formulations with different quantities of a dust reducing additive, and some including Bentone and acetone to eliminate or reduce bleeding.

TABLE 11

BLEEDING

| | Formulations by Wet Weight Percent | | | | | |
|---|---|---|---|---|---|---|
| Ingredient | Control | 34 | 35 | 36 | 37 | 38 |
| Microwhite 100 | 45.72 | 45.72 | 45.72 | 45.72 | 45.02 | 45.02 |
| SilCel 43/34 | 5.9 | 5.9 | 5.9 | 5.9 | 5.9 | 5.9 |
| Glass Bubbles | 0.5 | 0.5 | 0.5 | 0.5 | 0.5 | 0.5 |
| Attagel All | 2.93 | 2.93 | 2.93 | 2.93 | 2.93 | 2.93 |
| Nexton IP3 | 0.297 | 0.297 | 0.297 | 0.297 | 0.297 | 0.297 |
| WallPol CPS 104 | 2.6 | 2.6 | 2.6 | 2.6 | 2.6 | 2.6 |
| Rovace 9100 | 4.59 | 4.59 | 4.59 | 4.59 | 4.59 | 4.59 |
| Polyphase P-20-T | 0.037 | 0.037 | 0.037 | 0.037 | 0.037 | 0.037 |
| Troysan 174 | 0.05 | 0.05 | 0.05 | 0.05 | 0.05 | 0.05 |
| Triton X-405 | 0.1 | 0.1 | 0.1 | 0.1 | 0.1 | 0.1 |
| Glycerin | 0.3 | 0.3 | 0.3 | 0.3 | 0.3 | 0.3 |
| BYK 156 | 0.3 | 0.3 | 0.3 | 0.3 | 0.3 | 0.3 |
| Water | 33.393 | 33.393 | 33.393 | 33.393 | 33.393 | 33.393 |
| Bolar wax IGI 941 | 0.231 | None | 0.4 | 1.0 | None | None |
| Corn Oil | 0.792 | 0.8 | 0.8 | 0.8 | .96 | 1.2 |
| Kaydol Oil | 2.08 | 2.5 | 2.1 | 1.5 | 3.04 | 3.8 |
| Bentone 38 | 0.165 | | | | | |
| Acetone | 0.03 | | | | | |
| Total DRA | 3.3 | 3.3 | 3.3 | 3.3 | 4 | 4.95 |
| Airborne Dust | 6.3 mg/m$^3$ | 2.62 mg/m$^3$ | 4.15 mg/m$^3$ | 6.63 mg/m$^3$ | 1.9 mg/m$^3$ | 1.1 mg/m$^3$ |
| Drying Time | 3 days | 3 days | 3 days | 3 days | 3 days | 3 days |
| Bleeding @ 5 days | 0 | 1/32" | 1/16" | 1/16" | 1/8" | 1/4" |

It was found that the control formulation in Table 11, which included Bentone and acetone in the dust reducing additive, did not bleed. Formulations which did not contain Bentone and acetone (Examples 34–38), on the other hand, did experience bleeding. This was found to be true whether or not the dust reducing additive included wax, although formulations including wax were found to have a somewhat higher level of bleeding. Bleeding was measured by allowing the compound to age for three days, applying the compound to conventional wallboard, allowing the compound to dry for five days, and then measuring the distance of bleeding outwardly from the compound into the wallboard.

The patents, patent documents, and patent applications cited herein are incorporated by reference in their entirety as if each were individually incorporated by reference. It will be apparent to those of ordinary skill in the art that various changes and modifications maybe made without deviating from the inventive concept set forth above. Thus, the scope of the present invention should not be limited to the structures described in this application, but only by the structures described by the language of the claims and the equivalents of those structures.

What is claimed is:

1. A drywall joint compound composition comprising:
   (a) filler material;
   (b) binder material;
   (c) a dust reducing additive comprising oil; and
   (d) an effective quantity of a rheological additive to prevent the oil in the dust reducing additive from bleeding into surfaces to which the joint compound is applied.

2. A drywall joint compound composition as defined in claim 1, further comprising a polar additive.

3. A drywall joint compound composition as defined in claim 1, wherein the rheological additive comprises an organoclay.

4. A drywall joint compound composition as defined in claim 3, wherein the rheological additive comprises at least one of bentonite, hectorite, montmorillonite, and mixtures thereof.

5. drywall joint compound composition as defined in claim 2, wherein the polar additive comprises at least one of a mixture of methanol and water, propylene carbonate, a mixture of propylene carbonate and water, a mixture of ethanol and water, acetone, g-butyrolactone, or octylphenoxy polyethoxy ethanol.

6. A drywall joint compound composition as defined in claim 1, wherein the dust reducing additive comprises less than about 10% of the joint compound total wet weight.

7. A drywall joint compound composition as defined in claim 1, wherein the dust reducing additive is a mixture of at least two oils.

8. A drywall joint compound composition as defined in claim 1, wherein the dust reducing additive further comprises a wax.

9. A drywall joint compound composition as defined in claim 7, wherein the mixture of at least two oils comprises a mixture of mineral oil and vegetable oil.

10. A drywall joint compound composition as defined in claim 9, wherein the vegetable oil comprises at least one of cottonseed oil, linseed oil, coconut oil, olive oil, tung oil, peanut oil, corn oil, and mixtures thereof.

11. A drywall joint compound composition as defined in claim 1, wherein the rheological additive comprises less than about 1% of the joint compound total wet weight.

12. A drywall joint compound composition as defined in claim 2, wherein the polar additive comprises less than about 0.05% of the wall repair compound total wet weight.

13. A drywall joint compound composition as defined in claim 1, further comprising a thickener.

14. A drywall joint compound composition as defined in claim 1, further comprising a wetting agent.

15. A drywall joint compound composition as defined in claim 1, wherein the ratio of oil to wax in the dust reducing additive is at least about 10:1.

* * * * *

UNITED STATES PATENT AND TRADEMARK OFFICE
CERTIFICATE OF CORRECTION

PATENT NO. : 6,676,746 B2
DATED : January 13, 2004
INVENTOR(S) : Langford, Nathaniel P.

It is certified that error appears in the above-identified patent and that said Letters Patent is hereby corrected as shown below:

Column 3,
Line 65, delete "Theological" and insert -- rheological --, therefore;

Column 4,
Lines 21, 45 and 49, delete "Theological" and insert -- rheological --, therefore;
Line 26, delete "theological" and insert -- rheological --, therefore;

Column 7,
Line 14, delete "Theological" and insert -- rheological --, both (2) times;
Lines 18, 20 and 26, delete "Theological" and insert -- rheological --, therefore;
Line 27, delete "110%" and insert -- 10% --, therefore;

Column 11,
Lines 48 and 50, delete "mg/M$^3$" and insert -- mg/m$^3$ --, therefore;
Lines 54-64, delete "The formulation.......mixture." and insert same as a new paragraph on line 55;

Column 12,
Lines 54-60, delete "As shown.....compound." and insert the same as a new paragraph on line 55;

Column 15,
Line 16, after "joint" delete "10";
Line 64, delete "Theological" and insert -- rheological --, therefore;

Column 18,
Line 3, delete "Theological" and insert -- rheological --, therefore;

Column 21,
Line 5, insert -- A --, before "drywall";

UNITED STATES PATENT AND TRADEMARK OFFICE
CERTIFICATE OF CORRECTION

PATENT NO.    : 6,676,746 B2
DATED         : January 13, 2004
INVENTOR(S)   : Langford, Nathaniel P.

It is certified that error appears in the above-identified patent and that said Letters Patent is hereby corrected as shown below:

Column 22,
Line 18, after "A" insert -- sandable low dust --, therefore;
Line 19, delete "claim 1" and insert -- claim 8 --, therefore.

Signed and Sealed this

Twenty-second Day of March, 2005

JON W. DUDAS
*Director of the United States Patent and Trademark Office*